United States Patent
Wolff

(10) Patent No.: US 7,268,673 B2
(45) Date of Patent: Sep. 11, 2007

(54) ELECTRONIC DEVICE WITH A VIBRATOR AND AN EXCHANGEABLE COVER

(75) Inventor: Martin Wolff, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 200 days.

(21) Appl. No.: 10/517,680

(22) PCT Filed: May 13, 2003

(86) PCT No.: PCT/EP03/05069

§ 371 (c)(1),
(2), (4) Date: Sep. 30, 2005

(87) PCT Pub. No.: WO03/105313

PCT Pub. Date: Dec. 18, 2003

(65) Prior Publication Data

US 2006/0109082 A1  May 25, 2006

Related U.S. Application Data

(60) Provisional application No. 60/389,605, filed on Jun. 18, 2002.

(30) Foreign Application Priority Data

Jun. 11, 2002  (EP)  .................................. 02388040

(51) Int. Cl.
H04B 3/36  (2006.01)

(52) U.S. Cl. ..................... 340/407.1; 340/7.6; 361/752; 361/801

(58) Field of Classification Search .. 340/407.1–407.2, 340/7.6; 361/752, 801; 455/73, 550.1, 575.1, 455/90
See application file for complete search history.

(56) References Cited

U.S. PATENT DOCUMENTS

| | | | | |
|---|---|---|---|---|
| 5,943,214 A | * | 8/1999 | Sato et al. | ................... 361/752 |
| 6,177,881 B1 | * | 1/2001 | Castaneda et al. | ........... 340/7.6 |
| 6,542,381 B1 | * | 4/2003 | Sei et al. | ..................... 361/801 |
| 6,600,937 B1 | * | 7/2003 | Horngren | ..................... 455/567 |
| 2002/0027009 A1 | | 3/2002 | Sato et al. | ..................... 175/35 |

FOREIGN PATENT DOCUMENTS

| | | |
|---|---|---|
| WO | 00/56040 | 9/2000 |
| WO | 01/05521 | 1/2001 |

* cited by examiner

Primary Examiner—Jeffery Hofsass
Assistant Examiner—Hoi C. Lau
(74) Attorney, Agent, or Firm—Myers Bigel Sibley & Sajovec

(57) ABSTRACT

An electronic device comprising a frame part, a PCB (printed circuit board) provided with electronic components, a vibrator electrically connected to said PCB and being fixed in relation to the frame part, and an exchangeable outer cover releasably connected to the frame part. The vibrator is provided with an elastic fitting, and the exchangeable outer cover abuts the elastic fitting when it is mounted on the electronic device.

8 Claims, 1 Drawing Sheet

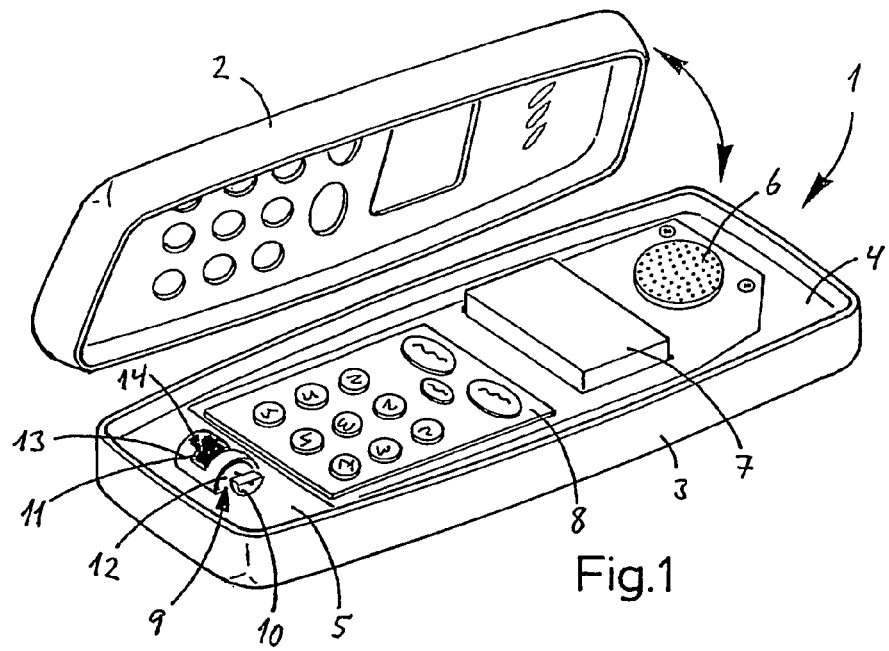
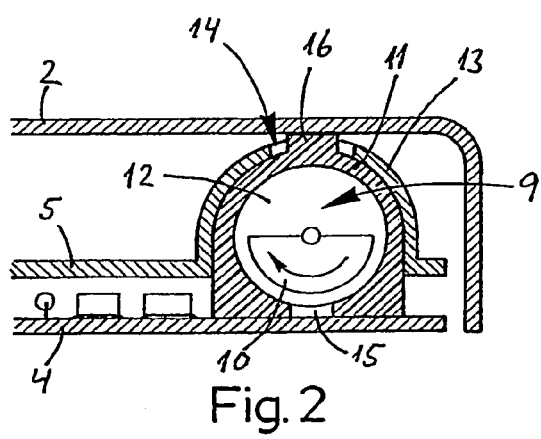
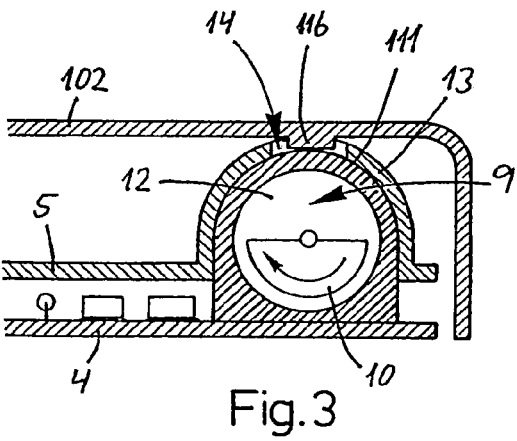
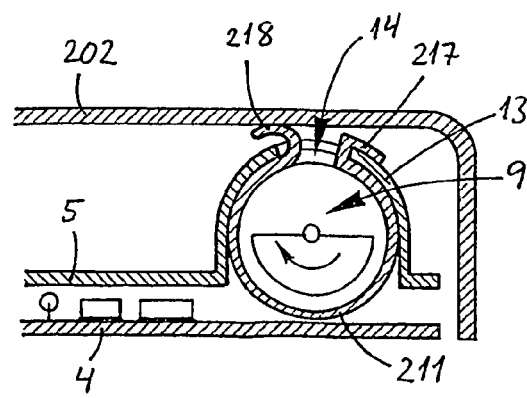

ELECTRONIC DEVICE WITH A VIBRATOR AND AN EXCHANGEABLE COVER

RELATED APPLICATIONS

The present application is a 35 U.S.C. §371 national phase application of PCT International Application No. PCT/EP03/05069, having an international filing date of May 13, 2003 and claiming priority to European Patent Application No. 02388040.4, filed Jun. 11, 2002 and United States Provisional Application No. 60/389,605 filed Jun. 18, 2002, the disclosures of which are incorporated herein by reference in their entireties. The above PCT International Application was published in the English language and has International Publication No. WO 03/105313 A1.

FIELD OF THE INVENTION

The invention relates to an electronic device comprising
a frame part;
a PCB (printed circuit board) provided with electronic components, which PCB is connected to the frame part;
a vibrator electrically connected to the PCB, which vibrator is fixed in relation to the frame part by means of an elastic fitting;
an exchangeable outer cover releaseably connected to the frame part, which exchangeable outer cover abuts on the elastic fitting when the exchangeable outer cover is mounted on the electronic device; and
a protective shell element connected to the frame part, which protective shell element is positioned between the PCB and the exchangeable outer cover; the vibrator being mounted on the protective shell element.

BACKGROUND OF THE INVENTION

Many electronic devices, such as mobile telephones, pagers, PDAs, etc., are provided with a vibrator that silently alerts a user when a message or an incoming call is received. The vibrator usually comprises a small electromotor provided with an unbalanced mass at a rotating shaft, and it is usually mounted in the electronic device by means of an elastic fitting, such as a rubber grommet or a flexible metal holder.

In electronic devices provided with fixed covers, such as a front cover and a back cover, the vibrator is conventionally mounted in a recess provided at the inner surface of one of the covers. However, in the electronic devices to which the invention relates, i.e. electronic devices provided with at least one exchangeable cover, the vibrator is positioned away from the exchangeable cover in order to ensure that the user does not accidentally destroy the vibrator or loosen it from its contact with the PCB. In these electronic devices the vibrator may be mounted in a recess of a not-exchangeable cover or in a holder that is connected to the PCB. Electronic devices with a vibrator mounted in this manner is known from e.g. US-A1-2002/0027009 and US-B1-6,177,881.

However, in cases where the vibrator is located away from the exchangeable cover the vibration that is produced when the unbalanced mass rotates must travel through a number of elements, such as the PCB and internal frame parts, before it reaches the exchangeable cover. The passage through these various elements dampens the vibration before it reaches the exchangeable cover, whereby the vibration that is experienced at the exchangeable cover is substantially weaker than the vibration at the location of the vibrator.

Electronic devices such as mobile telephones and components are therefore to an increasing extent made smaller and smaller. However, if the vibration waves must travel through a number of elements before they reach the cover, a relatively large vibrator must be employed in order to ensure that the experienced vibration has a certain magnitude. A smaller vibrator can be employed if it is mounted directly in a recess provided in the exchangeable cover, which, however, is undesirable since it would entail that the vibrator must be dismounted from the cover and re-mounted in the new cover. If such operation is necessary there is a great risk that the vibrator is lost or re-mounted wrongly which may cause the vibrator or other electronic components to be destroyed when the new cover is mounted.

It is therefore an object of the invention to provide an electronic device as mentioned in the opening paragraph in which it is possible to use a small vibrator that cannot be accidentally destroyed or loosened from the PCB and that is in relatively close contact with the exchangeable cover.

SUMMARY OF THE INVENTION

The object of the invention is achieved by arranging the electronic device mentioned in the opening paragraph in such manner that the vibrator is mounted on a side of the shell element that faces towards the PCB, and an access opening is provided in the shell element through which the exchangeable outer cover abuts on the elastic fitting.

Thereby the vibrator is held as well as protected by the shell element and the risk of accidentally destroying or loosening the vibrator when the cover is removed is minimized. Furthermore, the vibrator can be securely mounted in the main body of the electronic device while the vibration waves generated by the vibrator may still be transferred directly to the exchangeable cover via the elastic fitting provided on the vibrator. Another advantage that is achieved by arranging the exchangeable cover in abutment on the elastic fitting is elimination of the known problem of a rattling cover where the high requirements to production tolerances of the coupling means of the exchangeable cover and of the electronic device are not met. In the electronic device according to the invention the exchangeable cover abuts on the elastic fitting, and due to the inherent elasticity of the elastic fitting it is ensured that the exchangeable cover is always in elastic abutment on the elastic fitting thereby eliminating any tolerance slip. No rattling of the cover will therefore occur.

In a first embodiment of the invention the elastic fitting is provided with a protruding fitting part that protrudes through the access opening, and in a second embodiment of the invention the exchangeable outer cover is provided with a protruding cover part that protrudes through the access opening. The function of either of these embodiments is to ensure that the exchangeable cover abuts on the elastic fitting.

In a preferred embodiment the vibrator comprises a housing, and the elastic fitting surrounds at least a major part of the housing. By arranging the elastic fitting in this manner it is ensured that the vibration waves travel through the elastic fitting, while at the same time the elastic fitting protects any other parts of the electronic device from the direct vibrating movement of the housing of the vibrator.

The elastic fitting may comprise a rubber grommet or it may comprise a flexible metal holder. In either case the elastic fitting serves both as an elastic part on which the exchangeable cover abuts and as a flexible holding means for the vibrator.

Preferably, the electronic device is a mobile radio station, such as a mobile telephone, and the exchangeable outer cover is a front cover, while the frame part is a back cover.

It shall be emphasised that the term "comprise/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will be described in detail in the following with reference to the drawings in which FIG. 1 shows an electronic device according to the invention provided with an exchangeable front cover that is removed from the body of the electronic device;

FIG. 2 shows a cross-section of the contact between the vibrator and a cover in a first embodiment comprising a rubber grommet;

FIG. 3 shows a cross-section of the contact between the vibrator and a cover in a second embodiment comprising a rubber grommet; and FIG. 4 shows a cross-section of the contact between the vibrator and a cover in a third embodiment comprising a flexible metal holder.

DETAILED DESCRIPTION OF EMBODIMENTS OF THE INVENTION

FIG. 1 shows an electronic device according to the invention in the shape of a mobile telephone 1 provided with an exchangeable front cover 2 that is removed from the body of the mobile telephone 1. The mobile telephone 1 comprises a frame part 3 that, in the shown embodiment, consists of a back cover that is not exchangeable. The frame part 3 holds a PCB 4 that is located underneath a shell element 5 consisting of a thin metal plate. The PCB is provided with electronic components of which a loudspeaker 6 and a display 7 are visible, while other electronic components are concealed and protected by the shell element 5. An exchangeable key pad 8 is positioned on the shell element 5.

A vibrator 9 consisting of a small electromotor with an unbalanced mass 10 at a rotating shaft is fixed in the shell element 5 and is electrically connected to the PCB 4 by means of resilient contacts, such as pogo pins or the like, generally known in the art. The vibrator 9 is fixed in relation to the frame part 3 by means of an elastic fitting in form of a rubber grommet 11 that at least partly surrounds the housing 12 of the vibrator 9 (see FIGS. 2-3). The shell element 5 is provided with a holder part 13 formed by depressing a part of the shell element 5 to a shape that can receive the vibrator 9 and the rubber grommet 11. An access opening 14 is provided in the holder part 13, which access opening 14 provides access for the exchangeable front cover 2 to the rubber grommet 11 as it will be described below with reference to FIGS. 2 and 3.

It should be mentioned that the frame part 3 need not consist of the back cover, but could be a separate element whereto all other elements of the mobile telephone is connected. This will indeed be the case if the back cover as well as the front cover 2 is exchangeable.

FIG. 2 shows a cross-section of the contact between the vibrator 9 and the front cover 2 in a first preferred embodiment of the invention. The housing 12 of the vibrator 9 is partly surrounded by the rubber grommet 11, and the vibrator 9 is withheld in the shell element 5 by means of the rubber grommet 11 that is elastically squeezed into the holder part 13 of the shell element 5. The shell element 5 is located above the PCB 4 in order to protect the electronic components on the PCB 4 and is fixed in relation to the PCB 4 to ensure that the vibrator is in electrical contact with contact means, such as pogo pins, provided on the PCB 4 (not shown).

The rubber grommet 11 is provided with a longitudinal slit 15 in the bottom part, whereby the rubber grommet 11 can be opened when it is mounted on the housing 12 of the vibrator 9.

The rubber grommet 11 is further provided with a protruding grommet part 16 that protrudes through the access opening 14 in the holder part 13 of the shell element 5. When the front cover 2 is mounted on the mobile telephone 1, as illustrated in FIG. 2, the protruding grommet part 16 abuts on the inner surface of the front cover 2. This means that the vibration waves created by the vibrator 9 are transferred directly to the front cover 2 via the rubber grommet 11 and they need not travel through a large number of elements as it is the case with the known electronic devices with an exchangeable outer cover.

FIG. 3 shows a cross-section of the contact between the vibrator 9 and a front cover in an alternative embodiment of the invention. This second embodiment corresponds in many details to the first embodiment shown in FIG. 2 and the same reference numerals will be used for identical parts.

Also in this embodiment the housing 12 of the vibrator 9 is partly surrounded by an elastic fitting in form of a rubber grommet 111, and the vibrator 9 is withheld in the shell element 5 by means of the rubber grommet 111 that is elastically squeezed into the holder part 13 of the shell element 5. Again, the shell element 5 is located above the PCB 4 in order to protect the electronic components on the PCB 4 and is fixed in relation to the PCB 4 to ensure that the vibrator is in electrical contact with contact means, such as pogo pins, provided on the PCB 4 (not shown).

The rubber grommet 111 shown in FIG. 3 differs from the rubber grommet 11 shown in FIG. 2 in two points. First, the rubber grommet 11 is not provided with a longitudinal slit, i.e. the rubber grommet 111 must be mounted on the housing 12 of the vibrator 9 by longitudinally sliding the housing 12 of the vibrator 9 into the central opening of the rubber grommet 111. Second, the rubber grommet 111 is not provided with a protruding grommet part that protrudes through the access opening 14 in the holder part 13 of the shell element 5. On the contrary, in this embodiment the rubber grommet 111 is located fully within the holder part 13 of the shell element 5. The front cover 102 is, however, provided with a protruding cover part 116 that protrudes through the access opening 14 in the holder part 13 of the shell element 5, when the front cover 102 is mounted on the mobile telephone 1, as illustrated in FIG. 3, thereby abutting on the rubber grommet 111. Also in this embodiment, the vibration waves created by the vibrator 9 are transferred directly to the front cover 102 via the rubber grommet 111 and the protruding cover part 116.

FIG. 4 shows yet another cross-section of the contact between the vibrator 9 and a front cover in a further alternative embodiment of the invention. Again, this third embodiment corresponds in many details to the first embodiment shown in FIG. 2 and the same reference numerals will be used for identical parts.

Also in this embodiment the housing 12 of the vibrator 9 is partly surrounded by an elastic fitting which, however, has the form of a flexible metal holder 211, and the vibrator 9 is withheld in the shell element 5 by means of the flexible metal holder 211 that is firmly connected to the holder part 13 of the shell element 5 at one end 217, e.g. by soldering or welding or snapping. The vibrator 9 may also be snapped into the flexible metal holder 211. Again, the shell element 5 is located above the PCB 4 in order to protect the electronic components on the PCB 4 and is fixed in relation to the PCB 4 to ensure that the vibrator is in electrical contact with contact means, such as pogo pins, provided on the PCB 4 (not shown).

As mentioned above, the flexible metal holder 211 is firmly connected to the holder part 13 at one end 217, and the other end 218 of the metal holder 211 forms a rounded free end that protrudes out of the access opening 14 and elastically abuts on the front cover 202.

Also in this embodiment, the vibration waves created by the vibrator 9 are transferred directly to the front cover 202 via the flexible metal holder 211 in a manner very similar to the first embodiment shown in FIG. 2.

The flexible metal holder 211 may be connected to the shell element 5 in another manner than shown in FIG. 4 and it may be provided with a larger opening than shown in FIG. 4 such that the vibrator 9 can be snapped into the flexible metal holder 211. It is even perceivable that the flexible metal holder 211 with an elastic free end 218 abutting on the exchangeable cover 202 is an integral part of the shell element 5.

The invention has been described with reference to preferred embodiments of the invention. However, other modifications to the electronic device according to the invention may be applied than the ones described and shown. For instance, the vibrator need not be withheld by a shell element, but might be mounted directly on the PCB or on another part of the electronic device as long as it is ensured that the vibrator is in electrical contact with the PCB and abuts on the exchangeable cover via an elastic fitting.

The exchangeable cover may be a front cover as shown in FIGS. 1-4 or a back cover or both or any other cover or cover part that it is desirable to make exchangeable.

The vibrator is shown in a preferred embodiment in FIGS. 1-4, i.e. a vibrator comprising a housing with an electromotor and a rotating shaft with an unbalanced mass. However, the vibrator may be of any other suitable kind, such as a piezoelectric vibrator. The orientation of the rotating axle of the vibrator may also be different from the one shown, e.g. inclined or perpendicular to the PCB.

Even further modifications are applicable to an electronic device according to the invention without departing from the scope of the invention as defined in the accompanying claims.

The invention claimed is:

1. An electronic device comprising
   a frame part;
   a PCB (printed circuit board) provided with electronic components,
      PCB being connected to frame part;
   a vibrator electrically connected to the PCB, the vibrator being fixed in relation to the frame part by means of an elastic fitting; and
   an exchangeable outer cover releaseably connected to frame part the exchangeable outer cover abutting on the elastic fitting when the exchangeable outer cover is mounted on the electronic device; and
   a protective shell element connected to the frame part and having an access opening through which the exchangeable outer cover abuts on the elastic fitting, the protective shell element being positioned between the PCB and the exchangeable outer cover, the vibrator being mounted on a side of the shell element that faces the PCB.

2. An electronic device according to claim 1, wherein the elastic fitting is provided with a protruding fitting part that protrudes through the access opening.

3. An electronic device according to claim 1, wherein the exchangeable outer cover is provided with a protruding cover part that protrudes through the access opening.

4. An electronic device according to claim 1, wherein the vibrator comprises a housing; and the elastic fitting surrounds at least a major part of the housing.

5. An electronic device according to claim 1, wherein the elastic fitting comprises a rubber grommet.

6. An electronic device according to claim 1, wherein the elastic fitting comprises a flexible metal holder.

7. An electronic device according to claim 1, wherein the electronic device is a mobile telephone.

8. An electronic device according to claim 7, wherein the exchangeable outer cover is a front cover; and the frame part is a back cover.

* * * * *

UNITED STATES PATENT AND TRADEMARK OFFICE
CERTIFICATE OF CORRECTION

PATENT NO. : 7,268,673 B2  Page 1 of 1
APPLICATION NO. : 10/517680
DATED : September 11, 2007
INVENTOR(S) : Wolff It is certified that error appears in the above-identified patent and that said Letters Patent is hereby corrected as shown below:

On Title Page:

Item (30) Foreign Application Priority Data:
Please correct to read --June 11, 2002   (EP)   02388040.4--

Item (56) References Cited, U.S. Patent Documents:
Please correct to read --6,177,881 B1*   1/2001  Castaneda et al. 340/825.460--

Signed and Sealed this

Twenty-seventh Day of November, 2007

JON W. DUDAS
*Director of the United States Patent and Trademark Office*